(12) United States Patent
Kim et al.

(10) Patent No.: US 10,518,603 B2
(45) Date of Patent: Dec. 31, 2019

(54) AIR CONDITIONER FOR VEHICLE

(71) Applicant: HANON SYSTEMS, Daejeon (KR)

(72) Inventors: Tae Wan Kim, Daejeon (KR); Tae Yun Kong, Daejeon (KR); Jeong Hun Seo, Daejeon (KR); Jae Hwan Jung, Daejeon (KR); In Hyeok Kim, Daejeon (KR); Sae Dong Eom, Daejeon (KR)

(73) Assignee: Hanon Systems, Daejeon (KR)

( * ) Notice: Subject to any disclaimer, the term of this patent is extended or adjusted under 35 U.S.C. 154(b) by 200 days.

(21) Appl. No.: 15/521,115

(22) PCT Filed: Dec. 17, 2015

(86) PCT No.: PCT/KR2015/013803
§ 371 (c)(1),
(2) Date: Apr. 21, 2017

(87) PCT Pub. No.: WO2016/099151
PCT Pub. Date: Jun. 23, 2016

(65) Prior Publication Data
US 2017/0349026 A1    Dec. 7, 2017

(30) Foreign Application Priority Data

Dec. 17, 2014    (KR) .................. 10-2014-0181990
Oct. 2, 2015     (KR) .................. 10-2015-0138959

(51) Int. Cl.
*B60H 1/00*    (2006.01)
(52) U.S. Cl.
CPC ..... *B60H 1/00514* (2013.01); *B60H 1/00064* (2013.01); *B60H 1/00671* (2013.01);
(Continued)

(58) Field of Classification Search
CPC .......... B60H 2001/00135; B60H 2001/00192; B60H 1/00064; B60H 1/00321; B60H 1/00521; B60H 1/00528; B60H 1/00514
See application file for complete search history.

(56) References Cited

U.S. PATENT DOCUMENTS 1,955,006 A * 4/1934 Mateer .................. F28F 9/22
122/DIG. 3
3,151,674 A * 10/1964 Heller .................. F28F 9/02
165/158

(Continued)

FOREIGN PATENT DOCUMENTS

| KR | 20120138925 A | 12/2012 |
|---|---|---|
| KR | 20130070846 A | 6/2013 |
| WO | 2005102748 A1 | 11/2005 |

*Primary Examiner* — Tho V Duong
(74) *Attorney, Agent, or Firm* — Norton Rose Fulbright US LLP (57) ABSTRACT

Disclosed herein is an air conditioner for a vehicle, which includes: an air-conditioning case (120) having an air passageway for connecting an air inflow port (127) and an air outflow port (128) with each other; an evaporator (130) and a heater core (140) mounted on the air passageway; a blower unit (110) disposed at the side of the air inflow port (127) to blow air to the inside of the air-conditioning case (120); and a separator (150) disposed at the upstream side of the evaporator (130) to divide air, which is introduced into an air inflow passageway (227) of the air-conditioning case (120), into the right and the left. The air conditioner further includes an assembly end portion (152) disposed at an end portion of one side of the separator (150) to be inserted and assembled on the air inflow passageway (227) of the air-conditioning case (120) by forced fitting.

14 Claims, 11 Drawing Sheets

(52) U.S. Cl.
CPC .............. *B60H 2001/00135* (2013.01); *B60H 2001/00192* (2013.01)

(56) References Cited

U.S. PATENT DOCUMENTS

| | | | |
|---|---|---|---|
| 5,775,407 A | 7/1998 | Inoue | |
| 6,308,770 B1* | 10/2001 | Shikata | B60H 1/00064 165/126 |
| 2010/0043470 A1* | 2/2010 | Kang | B60H 1/00064 62/239 |
| 2011/0005719 A1* | 1/2011 | Seto | B60H 1/00064 165/61 |
| 2011/0005730 A1 | 1/2011 | Habasita et al. | |
| 2016/0303941 A1* | 10/2016 | Kinmartin | B60H 1/00064 |
| 2017/0059230 A1* | 3/2017 | Mazzocco | F25D 21/14 |

\* cited by examiner

FIG. 1

PRIOR ART

FIG. 2

PRIOR ART

FIG. 12

AIR CONDITIONER FOR VEHICLE

This application is a § 371 of International Application No. PCT/KR2015/013803 filed on Dec. 17, 2015, and claims priority from Korean Patent Application Nos. 10-2014-0181990 filed on Dec. 17, 2014 and 10-2015-0138959 filed on Oct. 2, 2015.

BACKGROUND OF THE INVENTION

Field of the Invention

The present invention relates to an air conditioner for a vehicle, which may prevent air leak to an end portion of a separator disposed on an air inflow passageway through which air is introduced from a blower unit to an air-conditioning case and allow a user to rapidly and correctly assemble the separator into the air inflow passageway.

Background Art

An air conditioner for a vehicle is an apparatus for heating or cooling the interior of the vehicle by heating or cooling air introduced from the interior or the exterior of the vehicle and blowing the heated or cooled air to the interior of the vehicle.

Such an air conditioner for a vehicle includes a blower unit for blowing air, and an evaporator unit for cooling the blown air, and a heater core unit for heating the blown air.

In the meantime, recently, a dual zone type air conditioner which respectively supplies air of different temperatures to a driver's seat and a passenger's seat inside the vehicle to cool and heat the interior of the vehicle individually has been developed and applied to vehicles.

Figure 1:
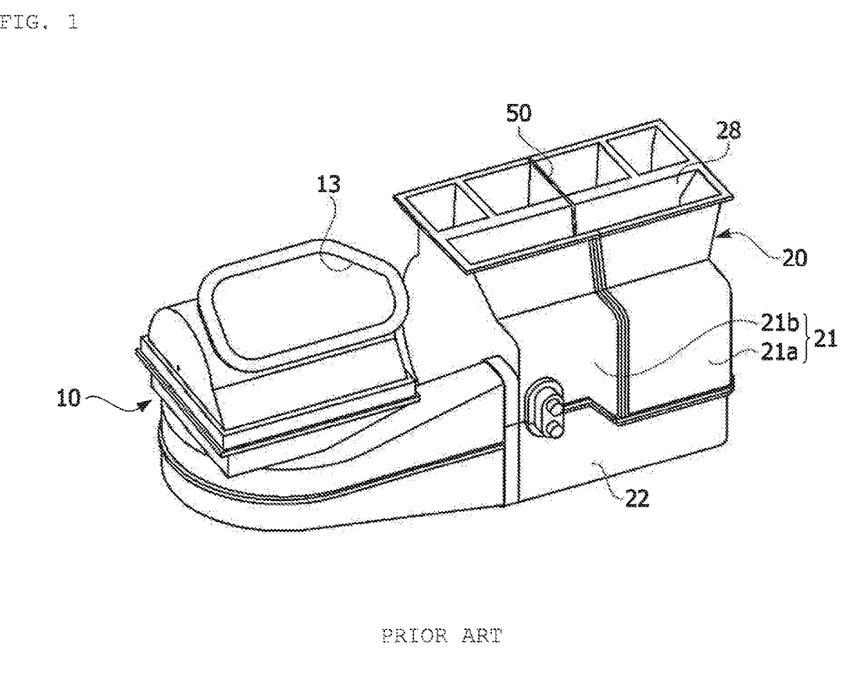
FIG. 1 is a perspective view of an air conditioner for a vehicle according to a related art.
Figure 2:
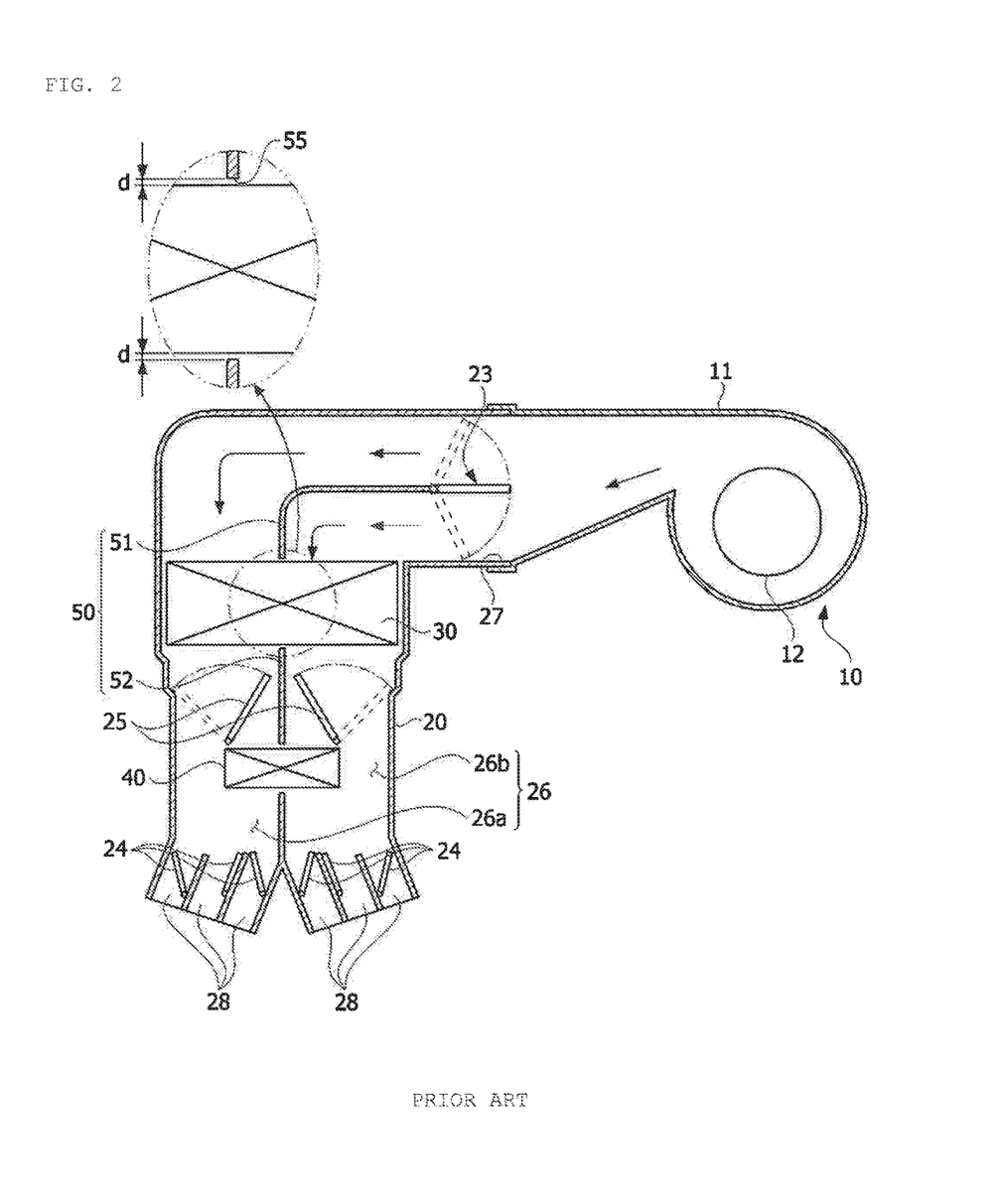
FIG. 2 is a schematic view showing an inside structure of the dual zone type air conditioner for a vehicle according to the related art.

FIG. 1 is a perspective view of an air conditioner for a vehicle according to a related art, and FIG. 2 is a schematic view showing an inside structure of the air conditioner for a vehicle according to the related art.

Referring to FIGS. 1 and 2, the air conditioner for the vehicle includes a blower unit 10, an air-conditioning case 20, an evaporator 30, a heater core 40, and a separator 50 (division wall).

The blower unit 10 inhales air introduced from the interior or the exterior of the vehicle and blows the introduced air to the air-conditioning case 20. The blower unit 10 includes a blower case 11 having an indoor and outdoor air inflow port 13 and a blower 12, which has a structure that a blower fan and a motor are combined and is disposed in the blower case 11.

The air-conditioning case 20 is combined to the blower case 11, and includes an air inflow port 27 for inflow of air and an air outflow port 28 for outflow of air. The air-conditioning case 20 further includes an air passageway 26 disposed inside the air-conditioning case 20 to connect the air outflow port 28 with the air inflow port 27. The air-conditioning case 20 may have a structure that an upper case 21 and a lower case 22 are combined together, and the upper case 21 may have a structure that a left case 21a (driver' side case) and a right case 21b (passenger' side case) are combined together.

The evaporator 30 and the heater core 40 are mounted inside the air passageway 26 in consecutive order to be spaced apart from each other at a predetermined interval, and function to respectively cool and heat the air blown from the blower unit 10.

The separator 50 divides the air passageway 26 into a left air passageway 26a and a right air passageway 26b on the basis of the evaporator 30. The separator 50 may be a division wall extending from the air inflow port 27 to the air outflow port 28. The separator 50 includes a first separator 51 disposed at the upstream side of the evaporator 30 and a second separator 52 disposed at the downstream side of the evaporator 30. The second separator 52 may have a structure that the left case 21a and the right case 21b are respectively assembled to the opposite sides thereof.

An air volume control door 25 for controlling air volumes distributed to the left air passageway 26a and the right air passageway 26b is disposed at the upstream side (front end) of the separator 50, namely, at the first separator 51. Temperature-adjusting doors 25 for controlling temperature are disposed between the evaporator 30 and the heater core 40. The temperature-adjusting doors 25 may be respectively mounted on the left and right air passageways 26a and 26b. Moreover, a plurality of mode doors 24 are respectively mounted at the air outflow ports of the left and right air passageways 26a and 26b to carry out various air discharge modes, such as a vent mode, a bi-level mode, a floor mode, a mixing mode, and a defrost mode, while controlling the degree of opening of the corresponding air outflow ports 28.

In the air conditioner for a vehicle having the above-mentioned structure, the indoor air or the outdoor air introduced into the air-conditioning case 20 by the blower unit 10 is distributed to the left and right air passageways 26a and 26b by the separator 50, is cooled while passing through the evaporator 30, and then, is selectively heated by the heater core 40. After that, the indoor air or the outdoor air is supplied toward the driver's seat or the passenger's seat in the interior of the vehicle through the air outflow ports 28 formed at the downstream side of the air passageways 26a and 26b to cool or heat the driver's seat space or the passenger's seat space in the interior of the vehicle.

Moreover, the air volume control door 23 mounted at the front of the evaporator 30 and the temperature-adjusting doors 25 respectively mounted on the left and right air passageways 26a and 26b of the air-conditioning case 20 may respectively control temperature and volume of the air discharged to the driver's seat and the passenger's seat. For instance, when the air volume control door 25 is controlled, seventh-stage air volume is supplied to the driver's seat, and first-stage air volume is supplied to the passenger's seat.

When the lower case 22 is combined after the evaporator 30 is assembled to the inside of the left and right cases 21a and 21b, the air conditioner is assembled. In this instance, the evaporator is combined to an evaporator mounting hole 55 formed in the separator 50 to penetrate laterally. In order to assemble the evaporator 30 with the separator 50, the evaporator mounting hole 55 has an area over a predetermined size to insert and mount the evaporator 30 thereinto. However, due to such a structure, when the evaporator 30 and the separator 50 are assembled with each other, a predetermined gap (d) is formed between the evaporator 30 and the separator 50.

Due to the gap (d) between the evaporator 30 and the separator 50, air leaks to the left air passageway 26a and the right air passageway 26b, and it is a factor to interrupt an independent control of dual zone air volumes. For instance, in case of controlling the driver's seat with the seventh-stage air volume and the passenger's seat with the first-stage air volume, because the air of the left air passageway 26a with higher-stage air volume leaks into the right air passageway 26b and increases also the air volume of the passenger's seat, the conventional air conditioner causes deterioration in control of air volume.

In the meantime, the separator 50 is completely assembled when an end portion of one side thereof is inserted into one side of the right and left cases 21a and 21b in a state where the lower case is separated from the right and left cases 21a and 21b.

As described above, while the separator 50 is inserted, the end portion of one side of the separator 50 collides against a curved form of the inside of the air-conditioning case 20, so the end portion of one side of the separator 50 or the inner wall surface of the air-conditioning case 20 is damaged. Accordingly, the conventional air conditioner is disadvantageous in that the air leak through the gap (d) becomes more severe.

Furthermore, the conventional air conditioner is disadvantageous in that the separator 50 is misassembled and productivity of the air conditioner is deteriorated due to deterioration in assemblability by contact between the end portion of the separator 50 and the inner form of the air-conditioning case 20.

Meanwhile, there are no repeated description and illustration because the conventional air conditioner is a well-known technology and is described in related art documents in detail.

SUMMARY OF THE INVENTION

Accordingly, the present invention has been made in view of the above-mentioned problems occurring in the prior art, and it is an object of the present invention to provide an air conditioner for a vehicle which may enhance sealability between a heat exchanger and a separator through a simple structure, enhance productivity by easily and rapidly assembling an air-conditioning case and the separator with each other, and prevent a gap from being caused by collision with the inside of the air-conditioning case when the separator is assembled.

Technical objects to be achieved by the present invention are not limited to the above-described objects and other technical objects that have not been described will be evidently understood by those skilled in the art from the following description.

To accomplish the above object, according to the present invention, there is provided an air conditioner for a vehicle including: an air-conditioning case having an air passageway for connecting an air inflow port and an air outflow port with each other; an evaporator and a heater core mounted on the air passageway; a blower unit disposed at the side of the air inflow port to blow air to the inside of the air-conditioning case; a separator disposed at the upstream side of the evaporator to divide air, which is introduced into an air inflow passageway of the air-conditioning case, into the right and the left; and an assembly end portion disposed at an end portion of one side of the separator to be inserted and assembled on the air inflow passageway of the air-conditioning case by forced fitting.

The assembly end portion has a shape corresponding to a side which gets in close contact with and is fixed onto the air inflow passageway.

The air-conditioning case has a fixing groove formed on the side corresponding to the assembly end portion so that the separator is fit and inserted thereinto.

The assembly end portion is formed by insert-molding elastically transformable material to the separator.

The assembly end portion includes: an insertion portion horizontally inserted into the air inflow passageway; and a stepped portion which is bent several times from an end portion of one side of the insertion portion downwardly and forwardly to form a stair shape.

The assembly end portion is formed by insert-molding elastically transformable material to the separator.

The stepped portion has a tapered portion to guide insertion of the assembly end portion by an inclined surface when the assembly end portion is inserted into the air inflow passageway.

Volumes of air passing through left and right air passageways of the air-conditioning case are controlled separately, so that a driver's seat space and a passenger's seat space of the vehicle are cooled and heated separately.

The air conditioner further includes a sealing part disposed between the separator and the evaporator to seal between the separator and the evaporator, wherein the sealing part is compressed to tubes of the evaporator to seal between the evaporator and the separator.

The sealing part includes: an elastic sealing member made of elastically transformable material and getting in contact with the evaporator; and a compression support part extending from an end portion of the separator to compress and support the elastic sealing member.

The elastic sealing member has a curved portion and its longitudinal direction is parallel with the longitudinal direction of the tubes. The compression support part elastically transforms the elastic sealing member so that the elastic sealing member comes in surface contact with the tubes.

The compression support part surrounds and supports the circumference of a rear part of the elastic sealing member, and an end portion of the compression support part is arranged to be spaced apart from the evaporator.

The compression support part includes: a first protrusion protruding from a base formed at an end portion of the separator; and a second protrusion formed to be spaced apart from the first protrusion at a predetermined interval to compress and support both sides of the elastic sealing member together with the first protrusion.

The first and second protrusions are formed in the plural in the vertical direction of the separator, and are forcedly inserted and fitted between pins of the evaporator.

The elastic sealing member is formed on the compression support part by insert-molding.

The compression support part has a protrusion portion, which protrudes outwardly from the both end portions of the elastic sealing member in the longitudinal direction, to prevent the both end portions of the elastic sealing member from getting in contact with an inner surface of the air-conditioning case when the assembly end portion is inserted into the air inflow passageway.

The elastic sealing member is made of a waterproof material to prevent permeation of condensate water of the evaporator.

As described above, the air conditioner for a vehicle according to a preferred embodiment of the present invention may prevent air leak between the right and left air passageways by sealing between the separator and the heat exchanger through the sealing part which is compressed to the tube of the heat exchanger, thereby enhancing controllability of air volumes in dual zones of the air conditioner.

Moreover, the air conditioner for a vehicle according to a preferred embodiment of the present invention may enhance sealability of the sealing part more by the compression support part which elastically transforms the elastic sealing member to get in surface contact with the tube of the heat exchanger.

Furthermore, the air conditioner for a vehicle according to a preferred embodiment of the present invention may prevent the assembled end portion of the separator from being damaged by collision with the inside of the air-conditioning case while the separator is inserted and mounted at the inlet of the evaporator of the air-conditioning case because the assembled end portion of the separator inserted into the air-conditioning case is made of an elastic material, thereby enhancing sealability more.

Additionally, the air conditioner for a vehicle according to a preferred embodiment of the present invention may prevent misassembly of the separator because a stepped portion tapered at the assembled end portion of the separator is easily and rapidly fixed and assembled to the inner surface of the air-conditioning case having the form corresponding to the form of the stepped portion, thereby increasing productivity of the air conditioner and reducing manufacturing costs.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an air conditioner for a vehicle according to exemplary embodiments of the present invention will be described with reference to the accompanying drawings.

Figure 3:
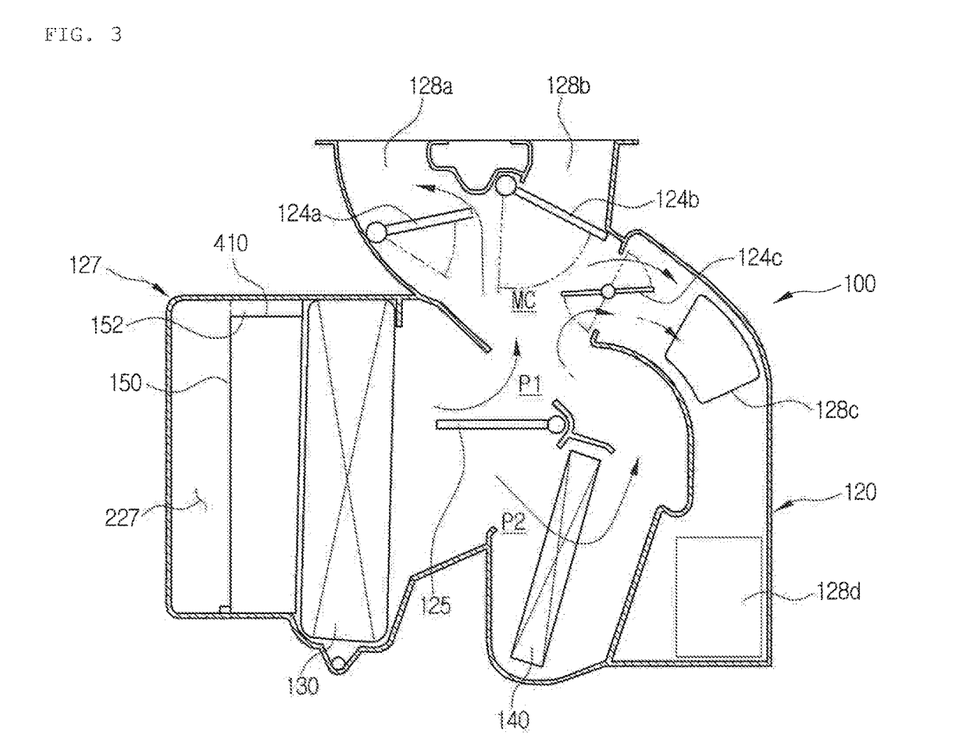
FIG. 3 is a sectional view showing an inside structure of an air conditioner for a vehicle according to an exemplary embodiment of the present invention.
Figure 4:
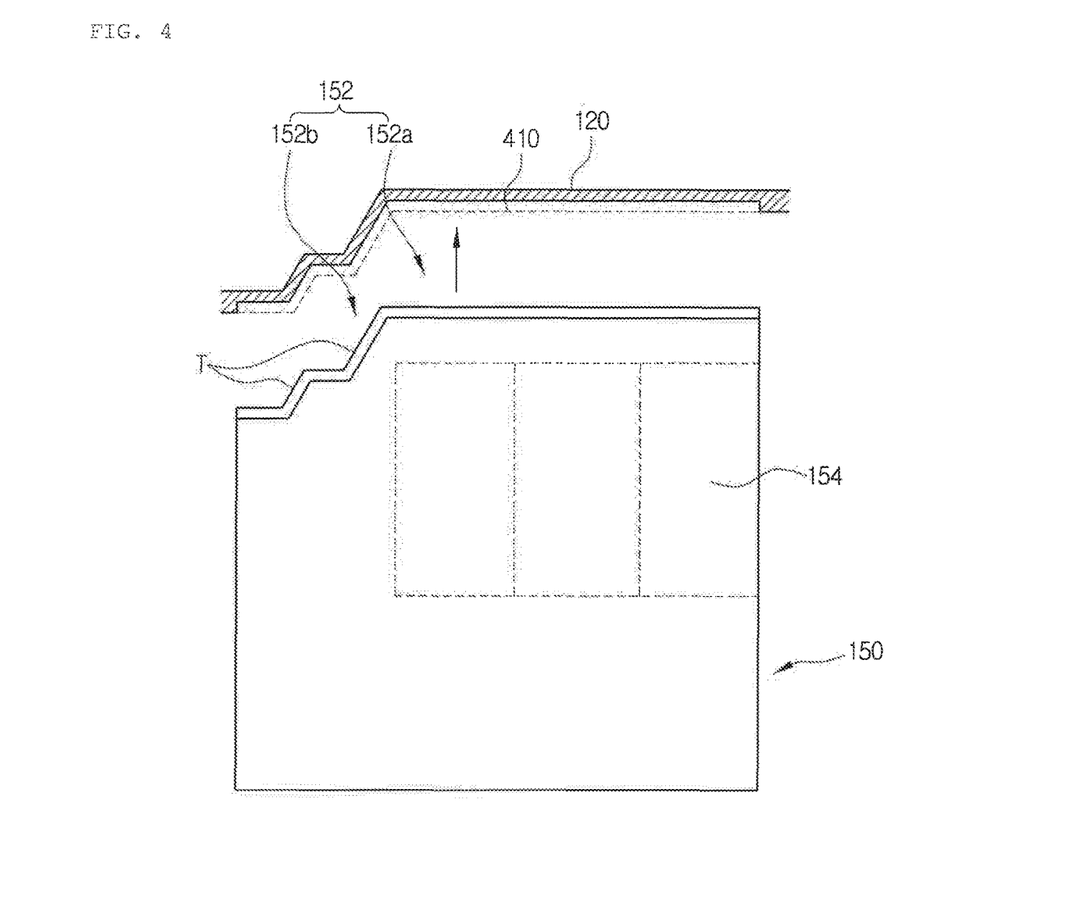
FIG. 4 is a front view of a separator of the air conditioner illustrated in FIG. 3.
Figure 5:
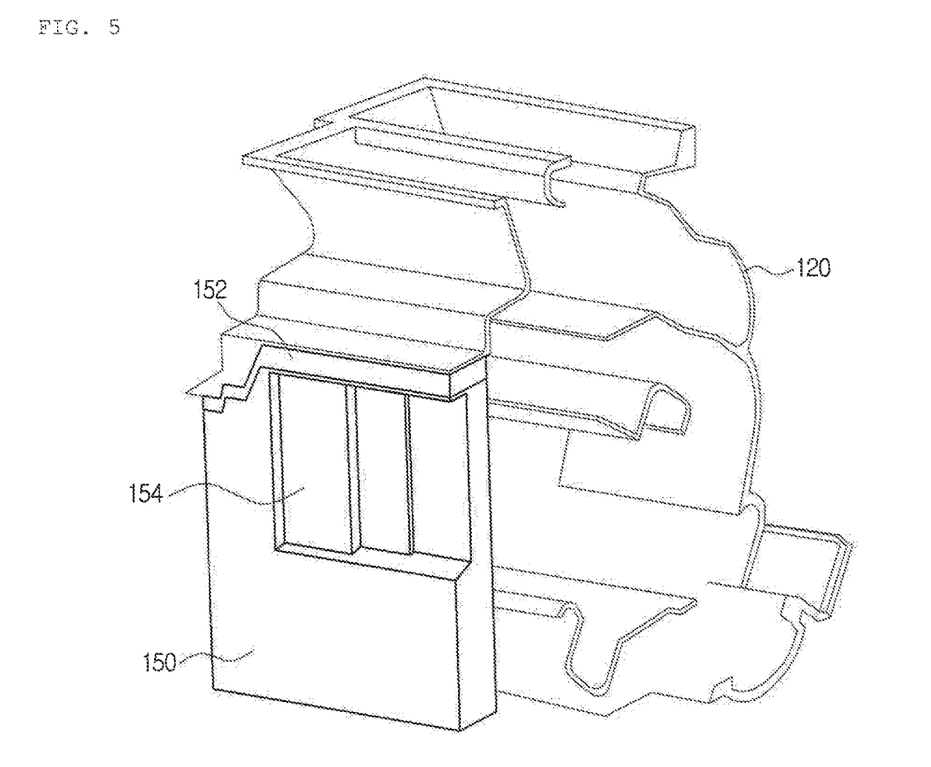
FIG. 5 is a perspective view showing an example that the separator illustrated in FIG. 4 is assembled to an air-conditioning case.
Figure 6:
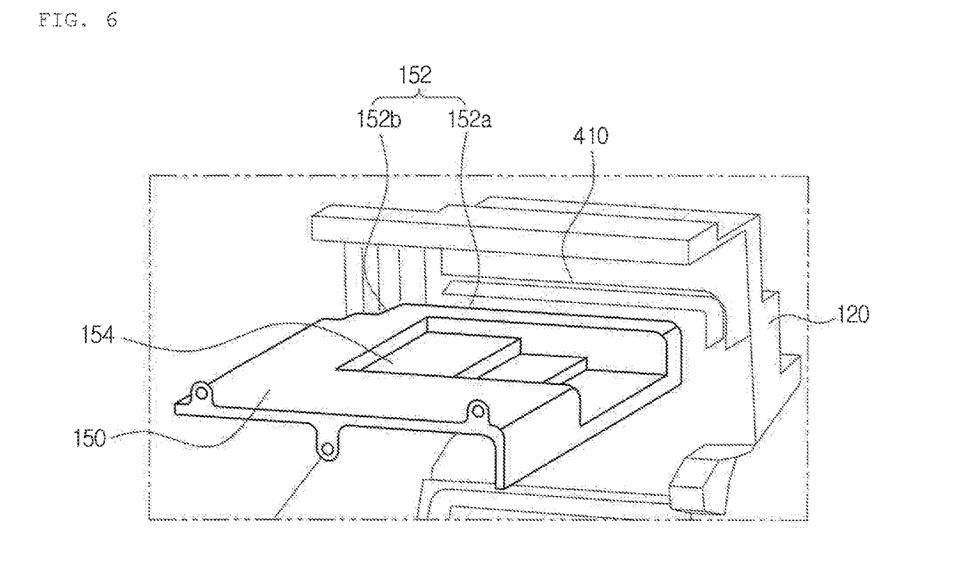
FIG. 6 is an enlarged perspective view of the form that the separator illustrated in FIG. 4 is assembled to the air-conditioning case.
Figure 7:
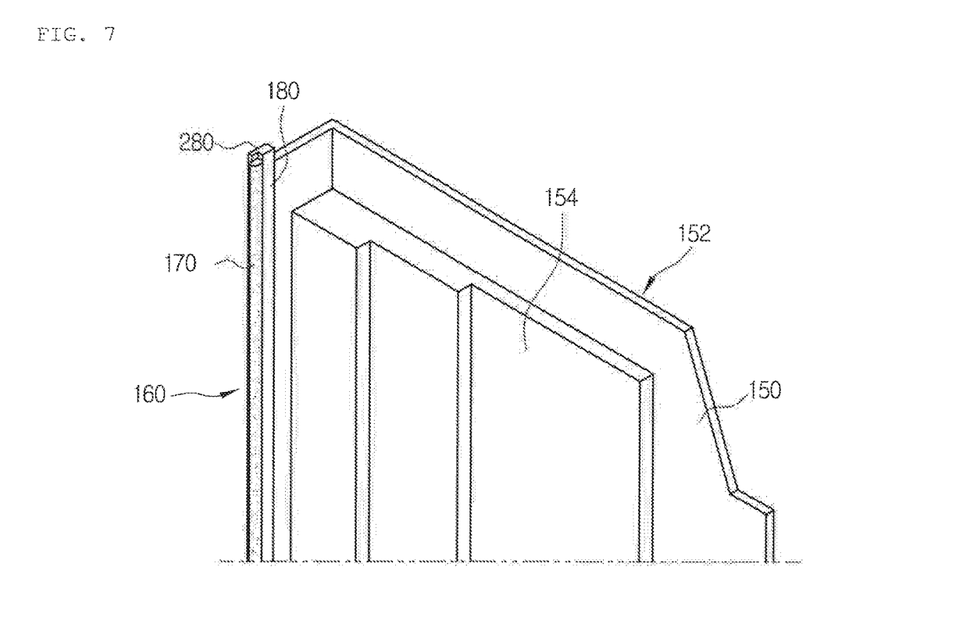
FIG. 7 is a perspective view showing an opposite side of the separator illustrated in FIG. 4.

FIG. 3 is a sectional view showing an inside structure of an air conditioner 100 for a vehicle according to an exemplary embodiment of the present invention, FIG. 4 is a front view of a separator 150 of the air conditioner illustrated in FIG. 3, FIG. 5 is a perspective view showing an example that the separator 150 illustrated in FIG. 4 is assembled to an air-conditioning case 120, FIG. 6 is an enlarged perspective view of the form that the separator 150 illustrated in FIG. 4 is assembled to the air-conditioning case 120, and FIG. 7 is a perspective view showing an opposite side of the separator 150 illustrated in FIG. 4.

As illustrated in FIG. 3, the air conditioner 100 for a vehicle according to the exemplary embodiment of the present invention includes: an air-conditioning case 120 having an air inflow port 127 at one side thereof and a plurality of air outflow ports 128a to 128d formed at the opposite side thereof; an evaporator 130 and a heater core 140 disposed inside the air-conditioning case 120; and a plurality of doors 124 and 125 which are mounted inside the air-conditioning case 120 to convert a flow rate and a direction of air heat-exchanged while passing through the evaporator 130 and the heater core 140.

A blower unit 110 (See FIG. 8) is mounted at the air inflow port 127 of the air-conditioning case 120 to blow indoor air or outdoor air.

Figure 8:
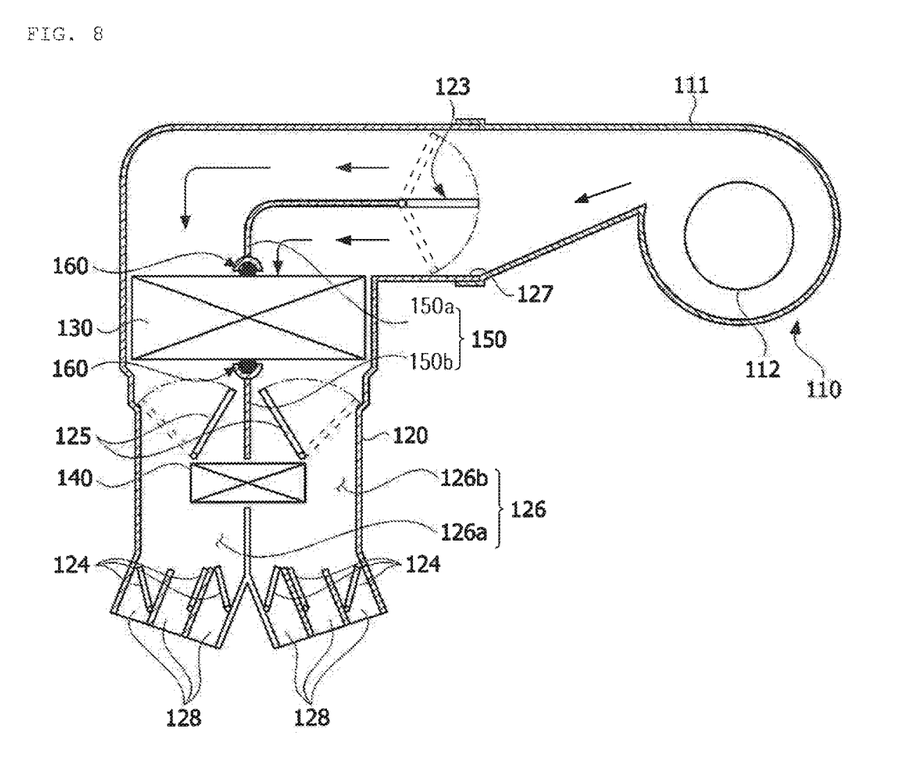
FIG. 8 is a schematic view showing an inside structure of an air conditioner for a vehicle according to another exemplary embodiment of the present invention.

The blower unit 110 has a blast fan mounted therein in order to forcedly inhale indoor air or outdoor air and blow the inhaled air to the air inflow port 127 of the air-conditioning case 120.

The air outflow ports 128 include a defrost vent 128a, a face vent 128b and floor vents 128c and 128d.

The defrost vent 128a is to discharge air toward a front window of the vehicle, the face vent 128b is to discharge air toward the face of a passenger who sits on a front seat, and the floor vents 128c and 128d is to discharge air toward the passenger's legs or feet.

The floor vents 128c and 128d are divided into a floor vent 128c for the front seat to discharge air toward the legs or feet of the passenger who sits on a front seat and a floor vent 128d for the rear seat to discharge air toward the legs or feet of the passenger who sits on the rear seat.

Moreover, the air-conditioning case 120 has an air passageway formed therein and a cold air passageway P1 and a warm air passageway 22 formed on the air passageway.

The doors 124 and 125 are rotatably combined to the inner wall surface of the air-conditioning case 120, and may be a temperature-adjusting door 125 and a mode door 124.

The temperature-adjusting door 125 controls the degree of opening of the warm air passageway P2 on which the heater core 140 is mounted to control an amount of air introduced into the warm air passageway P2 and an amount of air bypassing the warm air passageway P2, thereby controlling temperature of air mixed in a mixing chamber MC. The air mixed in the mixing chamber MC is supplied to the interior of the vehicle through the air outflow ports 128a to 128d.

The mode doors 124 are respectively mounted at inlets of the defrost vent 128a, the face vent 128b and the floor vents 128c and 128d in order to control the degree of opening of the vents.

In other words, the mode door 124 includes a defrost door 124a for opening and closing the defrost vent 128a, a face door 124b for opening and closing the face vent 128b, and floor doors 124c for opening and closing the floor vents 128c and 128d.

Meanwhile, the air inflow port 127 of the air-conditioning case 120 extends to have a straight section of a predetermined length from the side of the air-conditioning case 110 toward an outlet of the blower unit 110 so as to be connected with the outlet of the blower unit 110, and has an air inflow passageway 227 formed therein.

The air inflow passageway 227 is formed to be at a right angle to the right and left air passageways of the air-conditioning case 120, and is parallel with the evaporator 130.

A separator 150 is disposed on the air inflow passageway 227 to distribute the air introduced from the blower unit 110 to the evaporator 130 into the right and the left.

The separator 150 may have a plane shape perpendicularly arranged on the air inflow passageway 227. A front end portion of the separator 150 is arranged perpendicularly to divide the air inflow port 127 of the air-conditioning case 120 equally into back and forth, and a rear end portion, as shown in FIG. 7, extends from the front end portion to the central portion in the lateral direction of the evaporator 130 and is bent perpendicularly to the evaporator 130 so that a sealing part 160 is formed to get in contact with the evaporator 130.

Therefore, the air introduced into the air inflow port 127 of the air-conditioning case 120 by the blower unit 110 is divided equally by the front end portion of the separator 150. Therefore, the air introduced into one side is introduced into one side of the evaporator 130 near to the air inflow port 127, and the air introduced into the other side is introduced into the other side of the evaporator 130 far from the air inflow port 127.

In the meantime, the separator 150 is manufactured through the steps of assembling the heater core 140, the doors 124 and 125 and the evaporator 130 to the upper case of the air-conditioning case 120, inserting and fixing the end portion of one side of the separator 150 into the air inflow passageway 227 formed below the upper case, and assembling the lower case to the upper case. In this instance, a lower end portion of the separator 150 may be mounted when the lower case is assembled to the upper case in a state where the lower end portion of the separator 150 is previously fixed to the lower case.

According to an exemplary embodiment of the present invention, as shown in FIGS. 3 to 7, an assembly end portion 152 is formed at an upper end portion of the separator 150, which abuts on the air inflow passageway 227 of the air-conditioning case 120, to be inserted and forcedly fitted into the corresponding sides inside the air inflow passageway 227.

The assembly end portion 152 may be formed integrally by insert-molding an elastic material to the upper end portion of the separator 150 while the separator 150 is manufactured through injection-molding.

The assembly end portion 152 is formed at the upper end portion and gets in contact with the inner surface of the air inflow passageway 227 form a sealing structure.

In order to fix the assembly end portion 152 of the separator 150 on the air inflow passageway 227 of the air-conditioning case 120, as shown in FIGS. 4 and 6, a fixing groove 410 to which at least a part of the assembly end portion 152 of the separator 150 is inserted and fixed may be formed on the corresponding sides of the air inflow passageway 227, to which the upper end portion of the separator 150 is fixed.

In this instance, the assembly end portion 152 formed on the separator 150 is inserted into the fixing groove 410 to get in contact with the fixing groove 410 in a state where it is bent in the form of '¬' shape, thereby enhancing sealability more.

In relation with the both end portions of the separator 150 where the assembly end portion 152 is not formed, the lower case is sealed separately and is assembled to the upper case, then the separator 150 is completely mounted.

Meanwhile, referring to FIGS. 4 and 6, in order to more easily insert the separator 150 into the inner surface or the fixing groove 410 of the air inflow passageway 227, the assembly end portion 152 may have an insertion portion 152a and a stepped portion 152b.

The insertion portion 152a is a wide area that extends to abut on the separator 150 from the rear end portion located near to the evaporator 130 to the front end portion located at the air inflow port 127 and is located in front of the evaporator 130. The insertion portion 152a is inserted into the fixing groove 410 formed on the air inflow passageway 227.

The stepped portion 152b is bent several times from an end portion of the insertion portion 152a abutting on the air inflow port 127 to form a stair shape.

In this instance, the inner surface of the air inflow passageway 227 which fixes the assembly end portion 152 of the separator 150 has the form and length corresponding to the entire form which includes the insertion portion 152a and the stepped portion 152b, and the assembly end portion 152 of the separator 150 is forcedly fitted and inserted into the inner surface of the air inflow passageway 227.

Therefore, when the separator 150 is assembled onto the air inflow passageway 227, the stepped portion 152b of the assembly end portion 152 is fixed to get in close contact with the air inflow passageway 227, so that the insertion portion 152a of the separator 150 may be exactly inserted into the fixing groove 410 and assembled at a correct position.

As shown in FIG. 4, the stepped portion 152b of the separator 150 may have a tapered form (T) to guide insertion of the assembly end portion 152 due to an inclined surface when the assembly end portion 152 is inserted into the air inflow passageway 227 of the air-conditioning case 120.

In this instance, even though the separator 150 is inserted into the air inflow passageway 227 to be aside at a predetermined interval in the lateral direction, the separator 150 is guided to a correct position by the tapered surface and comes into contact with the air inflow passageway 227.

Meanwhile, a stepped distribution portion 154 of which the interval between stairs becomes narrower may be formed at one side of the upper portion of the separator 150 in order to evenly distribute the air introduced into the air inflow passageway 227 in the back and forth direction of the evaporator 130.

Moreover, referring to FIG. 7, the separator 150 may be formed by insert-molding an elastic sealing member 170 to the sealing part 160, which is bent toward the evaporator 130 and is vertically arranged.

In this instance, in order to firmly combine the elastic sealing member 170 to the sealing part 160 by insert-molding, a compression support part 180, which fixes to surround a lower portion and a side portion of the elastic sealing member 170.

The compression support part 180 has a protrusion portion 280, which protrudes outwardly from the both end portions of the elastic sealing member 170 in the longitudinal direction, to prevent the both end portions of the elastic sealing member 170 from being damaged by a direct contact with an inner structure of the air inflow passageway 227 while the separator 150 is assembled to the air inflow passageway 227 of the air-conditioning case 120. Such a compression support part 180 will be described in more detail later.

FIG. 8 is a schematic view showing an inside structure of an air conditioner for a vehicle according to another exemplary embodiment of the present invention. For your reference, FIG. 8 illustrates an example that the exemplary embodiment of the present invention is applied to a dual zone type air conditioner, and this exemplary embodiment of the present invention is different from the aforementioned exemplary embodiment in that a separator 150b for realizing a dual zone type air conditioner is further disposed at the downstream side of the evaporator of the air-conditioning case 120.

Because there is little difference between structures of the blower unit 110, the air-conditioning case 120, the evaporator 130 and the heater core 140 of the air conditioner illustrated in FIG. 8 and those of the air conditioner illustrated in FIG. 3, hereinafter, exemplary embodiments according to the present invention will be described in detail by designating the same reference numerals to parts having the same structures and functions as the parts illustrated in FIG. 3 in order to exclude duplicate descriptions.

Referring to FIG. 8, the air conditioner for a vehicle according to an exemplary embodiment of the present invention includes a blower unit 110, an air-conditioning case 120, an evaporator 130, a heater core 140 and a separator 150 (division wall).

The separator 150 partitions an air passageway 126 into the left and the right based on the evaporator 130, namely, into a left air passageway 126a and a right air passageway 126b.

According to this exemplary embodiment, the separator 150 includes a first separator 150a mounted at the upstream side of the evaporator 130 and a second separator 150b mounted at the downstream side of the evaporator 130. An air volume control door 123 is mounted at the upstream side (front end) of the separator 150, namely, at the first separator 150a, and temperature-adjusting doors 125 for controlling temperature are respectively mounted on the left and right air passageways 126a and 126b between the evaporator 130 and the heater core 140. Additionally, a plurality of mode doors 124 are respectively mounted at air outflow ports 128 of the left and right air passageways 126a and 126b.

The air conditioner having the above-mentioned structure may independently control temperature and volume of air discharged to the driver's seat and the passenger's seat through control of the air volume control door 123 mounted in front of the evaporator 130 and control of the temperature-adjusting doors 125 respectively mounted on the left and right air passageways 126a and 126b of the air-conditioning case 120, thereby separately cooling and heating the driver's seat space and the passenger's seat space of the vehicle.

According to the exemplary embodiment of the present invention, a sealing part 160 is disposed between the evaporator 130 and the separator 150 to seal them.

In this exemplary embodiment, the sealing parts 160 are respectively disposed on both sides of the evaporator 130. In this instance, one of the sealing parts 160 seals between one side of the evaporator 130 and the first separator 150a, and the other one seals between the other side of the evaporator 130 and the second separator 150b. The present invention is not restricted to the structure of this exemplary embodiment, and one sealing part 160 may be disposed on one of the both sides of the evaporator 130.

Figure 9:
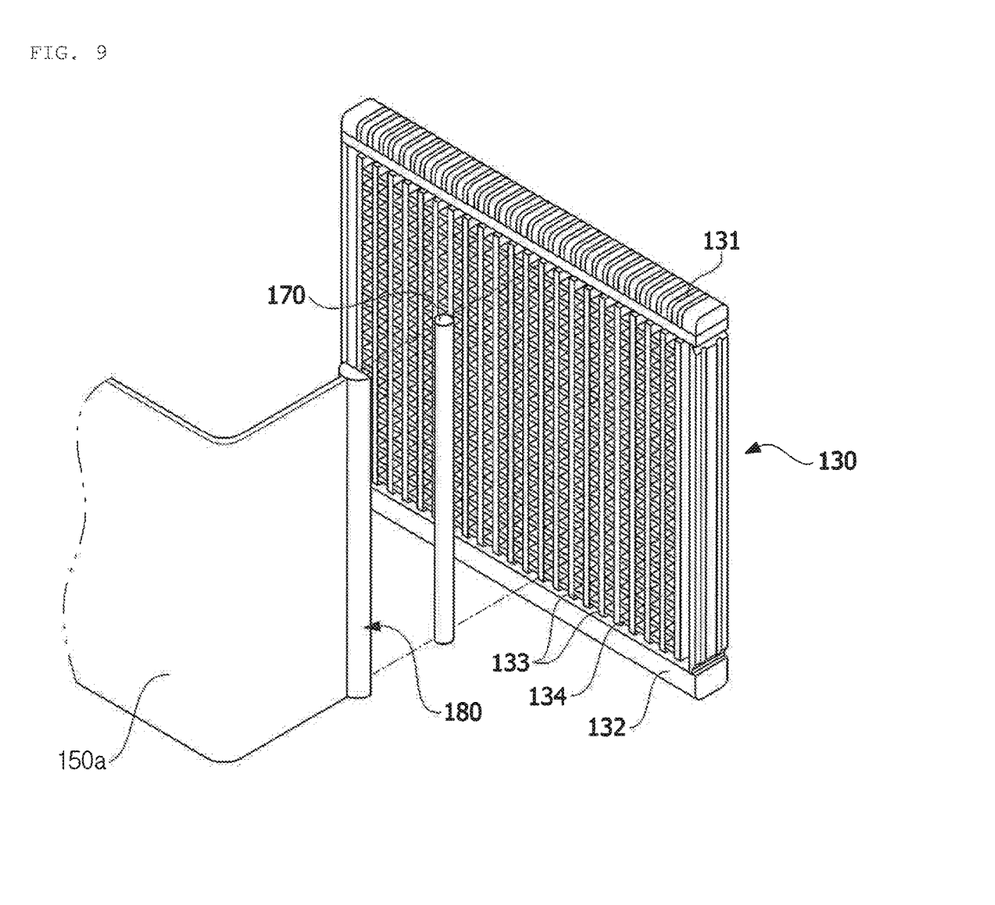
FIG. 9 is an exploded perspective view showing a sealing part illustrated in FIG. 8.
Figure 10:
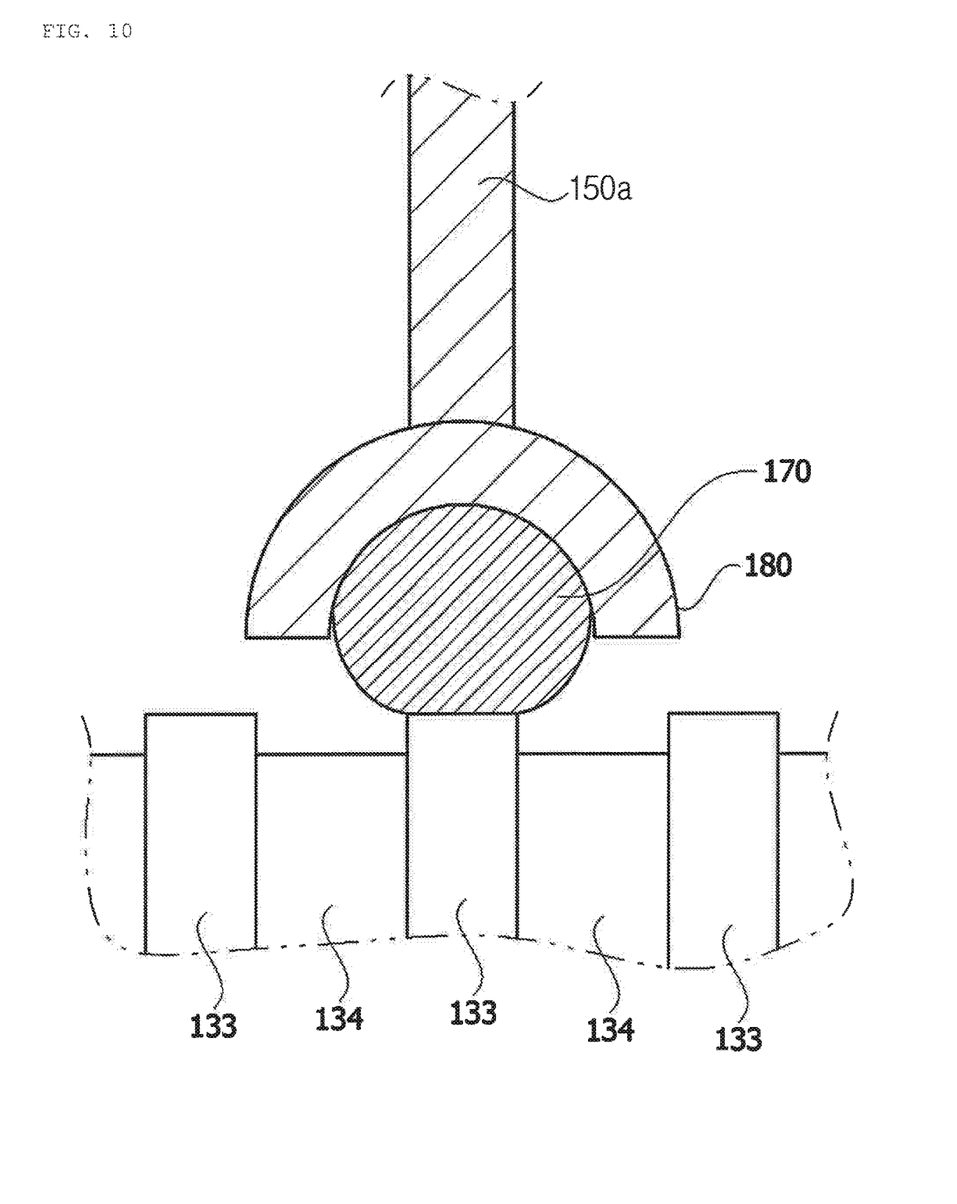
FIG. 10 is a top cross-sectional view of the sealing part illustrated in FIG. 8.

FIG. 9 is an exploded perspective view showing the sealing part illustrated in FIG. 8, and FIG. 10 is a top cross-sectional view of the sealing part illustrated in FIG. 8.

FIGS. 9 and 10 illustrate the structure of the sealing part 160 arranged on the first separator 150a. Hereinafter, the structure of the sealing part 160 will be described. The sealing part 160 arranged on the second separator 150b has the same structure as the sealing part 160 arranged on the first separator 150a and is arranged symmetrically with the sealing part 160 arranged on the first separator 150a in the arrangement direction, and there is no repeated description.

The evaporator 130 includes: first and second header tanks 131 and 132 arranged up and down to be spaced apart from each other at a predetermined interval; a plurality of tubes 133 formed between the first and second header tanks 131 and 132 to communicate with the first and second header tanks 131 and 132; and a plurality of pins 134 interposed between the tubes 133. Here, the tubes 133 are arranged to form a plurality of arrays in the lateral direction, and the pins 134 are arranged to be space apart from one another at predetermined intervals in the vertical direction.

The sealing part 160 is compressed to the tubes 133 of the evaporator 130 to seal between the evaporator 130 and the first separator 150a. The sealing part 160 includes an elastic sealing member 170 which comes into contact with the evaporator 130, and a compression support part 180 which compresses and supports the elastic sealing member 170.

The elastic sealing member 170 has a curved portion, and may be a rod or a bar of which the longitudinal direction is parallel with the longitudinal direction of the tubes 133. The elastic sealing member 170 may be made of a material capable of being transformed elastically, such as rubber or silicon. The elastic sealing member 170 may be arranged to get in contact with the tubes 133 located at the central area of the evaporator 130. Because condensate water is generated in the evaporator 130, the elastic sealing member 170 may be made of a waterproof material to prevent permeation of the condensate water of the evaporator 130.

The compression support part 180 extends from an end portion of the first separator 150a and compresses and supports the elastic sealing member 170 to elastically transform the elastic sealing member 170, so that the elastic sealing member 170 comes into surface contact with the tubes 133. The compression support part 180 may surround and support the circumference of a rear part of the elastic sealing member 170.

The compression support part 180 may have a curved contact surface to correspond to the curved portion of the elastic sealing member 170, and may be consecutively formed in the longitudinal direction of the elastic sealing member 170. Through the aforementioned structure, the compression support part 180 compresses and supports the circumferential surface of the rear part of the elastic sealing member 170 so that the elastic sealing member 170 can seal the sealed portion stably.

An end portion of the compression support part 180 is arranged to be spaced apart from the evaporator 130 in order to prevent the compression support part 180 from getting in contact with the pins 134 or the tubes 133 and having an influence on heat-exchanging performance of the evaporator 130.

Figure 11:
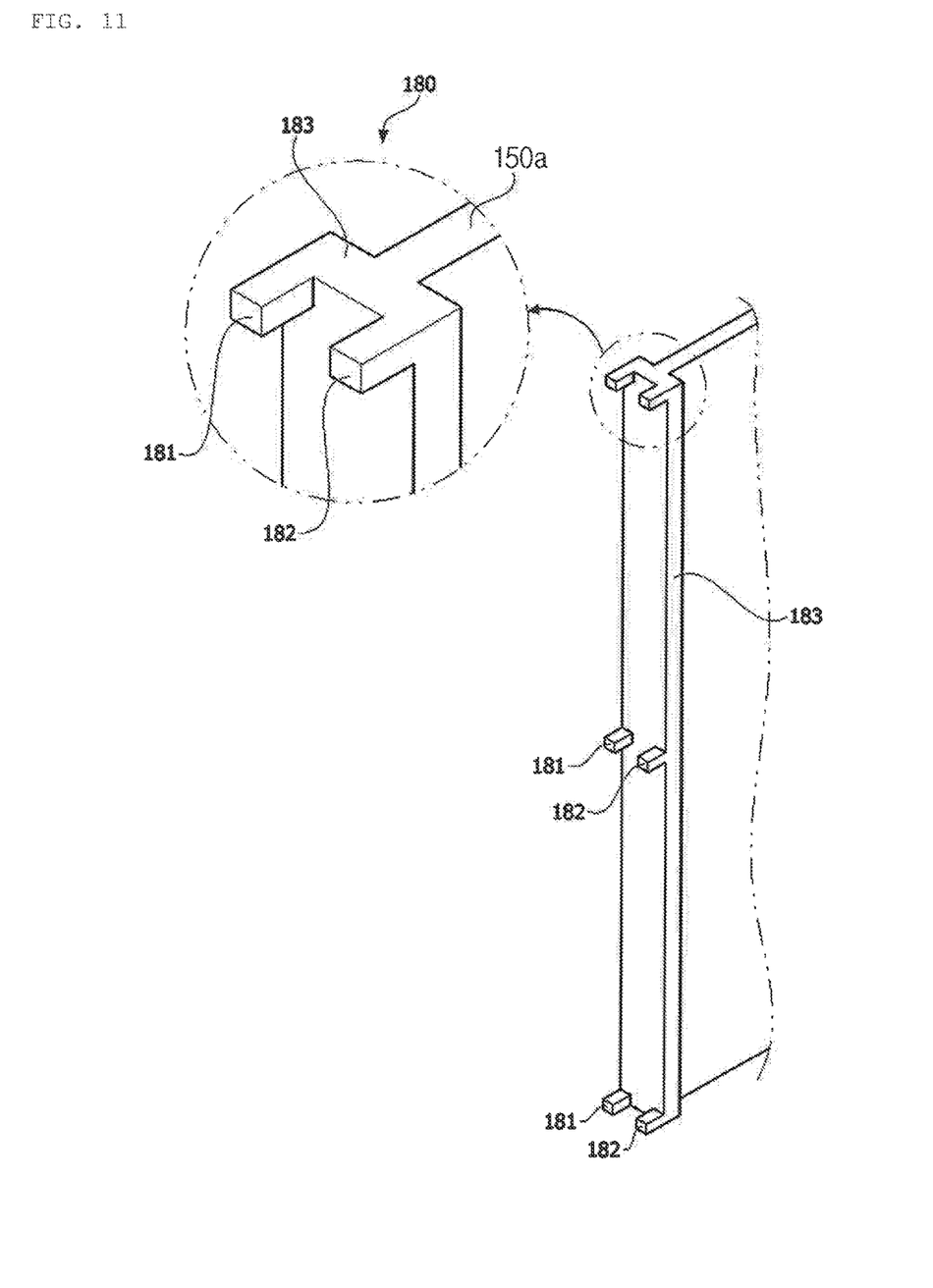
FIG. 11 is a perspective view of a compression support part of FIG. 8 according to a modification of the present invention.
Figure 12:
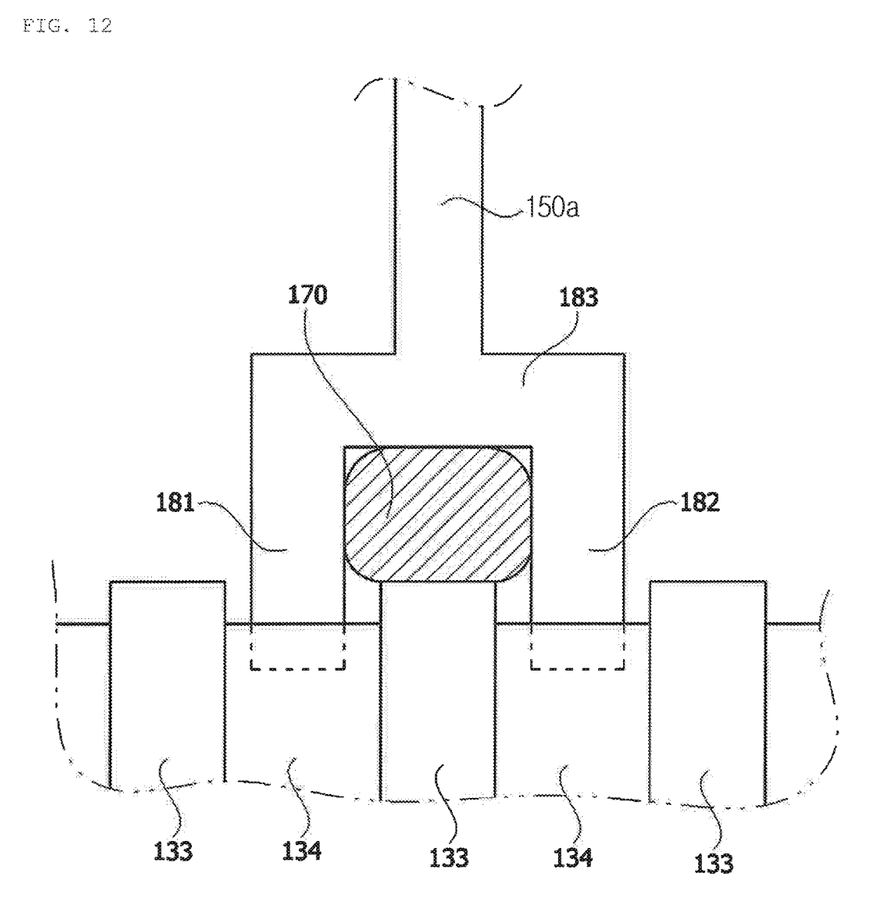
FIG. 12 is a top cross-sectional view showing a sealing part structure to which the compression support part illustrated in FIG. 11 is applied.

FIG. 11 is a perspective view of a compression support part 180 of FIG. 8 according to an exemplary embodiment of the present invention, and FIG. 12 is a top cross-sectional view showing a sealing part 160 structure to which the compression support part 180 illustrated in FIG. 11 is applied.

According to the exemplary embodiment of the present invention, the compression support part 180 has protrusions which are spaced apart from one another, differently from the aforementioned exemplary embodiments. A base 183 which has a width more expanded than that of a first separator 150 is formed at an end portion of the first separator 150a, and the compression support part 180 is formed on the base 183.

The compression support part 180 according to the exemplary embodiment of the present invention includes: a first protrusion 181 protruding from the base 183; and a second protrusion 182 formed to be spaced apart from the first protrusion 181 at a predetermined interval to compress and support the both sides of the elastic sealing member 170 together with the first protrusion 181.

Compression surfaces which face each other are respectively formed on the first protrusion 181 and the second protrusion 182 to compress the elastic sealing member 170, and another compression surface is formed on the base 183. The elastic sealing member 170 is elastically transformed by the '⊏'-shaped compression surfaces.

The first and second protrusions 181 and 182 may be forcedly inserted and fitted between the pins 134 of the evaporator 130, and may be formed in the plural in the vertical direction of the first separator 150a. As described above, the air conditioner for the vehicle according to the exemplary embodiment of the present invention may firmly keep the position of the compression support part 180 by combining the compression support part 180 to the evaporator 130, and minimize deterioration in heat-exchanging performance, which may occur due to a contact between the compression support part 180 and the evaporator 130, by forming the combination structure through the protrusions that are spaced apart from each other in the vertical direction.

The sealing structure between the evaporator 130 and the first separator 150a is described in this exemplary embodiment of the present invention, but the structure of the sealing part 160 described above may be applied between the heater core 140 and the first separator 150b in the same way. However, because the heater core 140 does not generate condensate water, it is not necessary that the elastic sealing member 170 is made of a waterproof material.

Hereinafter, the action of the air conditioner 100 for the vehicle according to the exemplary embodiments of the present invention will be described.

The air conditioner 100 for the vehicle relates to the structure to fix the separator 150 on the air inflow passageway 227, which introduces air from the blower unit 30 to the evaporator 130 of the air-conditioning case 120. As described above, the air conditioner is assembled through the method that the upper end portion of the separator 150 having the assembly end portion 152 is inserted into the corresponding sides inside the air inflow passageway 227 of the air-conditioning case 120.

Because the assembly end portion 152 of the separator 150 is made of a rubber material, it may enhance sealability and prevent air leak to the end portion of the separator 150 owing to the close contact between the separator 150 and one side of the air inflow passageway 227.

Because the separator 150 of the conventional air conditioner is made of a plastic material, when the separator 150 is inserted into the air-conditioning case 120, the end portion of the separator 150 collides against the inner surface of the air inflow passageway 227, so the air-conditioning case 120 or the separator 150 is frequently damaged.

However, according to the exemplary embodiments of the present invention, because the assembly end portion 152 is made of the elastic rubber material, it may prevent damage of the air-conditioning case 120 or the separator 150.

Moreover, according to the exemplary embodiment of the present invention, because the assembly end portion 152 of the separator 150 has the insertion portion 152a and the stepped portion 152b and the entire form of the insertion portion 152a and the stepped portion 152b is the form corresponding to the form of one side of the air inflow passageway 227, the separator 150 may be assembled at the correct position using the stepped portion 152b.

In other words, when the separator 150 is inserted, the separator 150 is inserted at the position that the stepped portion 152b of the separator 150 is forcedly inserted and fitted to the corresponding sides of the air inflow passageway 227 while regulating its position in the direction of right and left of the air-conditioning case 120.

Furthermore, because the stepped portion 152b is tapered, when the separator 150 is inserted, the corresponding sides of the air inflow passageway 227 engage each other and come into contact with each other, so that the separator 150 can be exactly fixed and assembled at the predetermined position in the lateral direction of the air-conditioning case 120.

Additionally, because the sealing part 160 of the separator 150 further includes the elastic sealing member 170 and the elastic sealing member 170 is combined with the edge portion of one end portion of the assembly end portion 152, it may enhance sealing performance of the separator 150 more.

In this instance, the compression support part 180 formed on the sealing part 160 firmly combines the elastic sealing member 170 and has the protrusions 280 protruding outwardly from the end portion of the elastic sealing member 170 in the longitudinal direction, so that the elastic sealing member 170 is prevented from getting in contact with the inner structure of the air-conditioning case 120 when the separator 150 is assembled. Therefore, the air conditioner for the vehicle according to the exemplary embodiments of the present invention may prevent damages and air leak which may be caused by contact.

As described above, since the assembly end portion 152 and the sealing part 160 is formed at the upper end portion of the separator 150 by insert-molding of the elastic material and the assembly end portion 152 has the stepped portion 152b and the tapered form, the air conditioner 100 for the vehicle according to the exemplary embodiments of the present invention may maximize sealability, prevent damages by collision when the separator 150 is assembled, and allow the separator 150 to be easily and rapidly assembled at the correct position.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle, which includes: an air-conditioning case having an air passageway for connecting an air inflow port and an air outflow port with each other; an evaporator and a heater core mounted on the air passageway; a blower unit disposed at the side of the air inflow port to blow air to the inside of the air-conditioning case; and a separator disposed at the upstream side of the evaporator to divide air, which is introduced into an air inflow passageway of the air-conditioning case, into the right and the left, the air conditioner comprising:

an assembly end portion disposed at an end portion of an upper side of the separator to be inserted and assembled on the air inflow passageway of the air-conditioning case by forced fitting, wherein the assembly end portion is formed by insert-molding elastically transformable material to the separator and wherein the assembly end portion comprises: an insertion portion horizontally inserted into the air inflow passageway; and a stepped portion which is bent several times from an end portion of one side of the insertion portion downwardly and forwardly to form a stair shape.

2. The air conditioner according to claim 1, wherein the assembly end portion gets in close contact with an inner surface of the air inflow passageway to form a sealing structure.

3. The air conditioner according to claim 1, wherein the air-conditioning case has a fixing groove formed on the side corresponding to the assembly end portion so that the separator is fit and inserted thereinto.

4. The air conditioner according to claim 1, wherein the stepped portion has a tapered portion to guide insertion of the assembly end portion by an inclined surface when the assembly end portion is inserted into the air inflow passageway.

5. The air conditioner according to claim 1, wherein volumes of air passing through left and right air passageways of the air-conditioning case are controlled separately, so that a driver's seat space and a passenger's seat space of the vehicle are cooled and heated separately.

6. The air conditioner according to claim 1, further comprising:

a sealing part disposed between the separator and the evaporator to seal between the separator and the evaporator, wherein the sealing part is compressed to tubes of the evaporator to seal between the evaporator and the separator.

7. The air conditioner according to claim 6, wherein the sealing part comprises:

an elastic sealing member made of elastically transformable material and getting in contact with the evaporator; and a compression support part extending from an end portion of the separator to compress and support the elastic sealing member.

8. The air conditioner according to claim 7, wherein the elastic sealing member has a curved portion, and its longitudinal direction is parallel with the longitudinal direction of the tubes, and wherein the compression support part elastically transforms the elastic sealing member so that the elastic sealing member comes in surface contact with the tubes.

9. The air conditioner according to claim 7, wherein the compression support part surrounds and supports the circumference of a rear part of the elastic sealing member, and wherein an end portion of the compression support part is arranged to be spaced apart from the evaporator.

10. The air conditioner according to claim 7, wherein the compression support part comprises:

a first protrusion protruding from a base formed at an end portion of the separator; and a second protrusion formed to be spaced apart from the first protrusion at a predetermined interval to compress and support both sides of the elastic sealing member together with the first protrusion.

11. The air conditioner according to claim 10, wherein the first and second protrusions are formed in the plural in the vertical direction of the separator, and are forcedly inserted and fitted between pins of the evaporator.

12. The air conditioner according to claim 10, wherein the elastic sealing member is formed on the compression support part by insert-molding.

13. The air conditioner according to claim 10, wherein the compression support part has a protrusion portion, which protrudes outwardly from the both end portions of the elastic sealing member in the longitudinal direction, to prevent the both end portions of the elastic sealing member from getting in contact with an inner surface of the air-conditioning case when the assembly end portion is inserted into the air inflow passageway.

14. The air conditioner according to claim 10, wherein the elastic sealing member is made of a waterproof material to prevent permeation of condensate water of the evaporator.

* * * * *